(12) United States Patent
De Pauw et al.

(10) Patent No.: US 6,370,684 B1
(45) Date of Patent: Apr. 9, 2002

(54) METHODS FOR EXTRACTING REFERENCE PATTERNS IN JAVA AND DEPICTING THE SAME

(75) Inventors: Wim De Pauw, Scarborough; Olivier Gruber, Jackson Heights; Ravi B. Konuru, Tarrytown, all of NY (US); Gary S. Sevitsky, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/290,493

(22) Filed: Apr. 12, 1999

(51) Int. Cl.[7] .................................................. G06F 9/44

(52) U.S. Cl. .............................................. 717/4; 717/1

(58) Field of Search ............... 717/1, 4, 11; 707/103 Z, 707/206; 345/418, 700, 763, 764, 967

(56) References Cited

U.S. PATENT DOCUMENTS

| | | | | |
|---|---|---|---|---|
| 5,740,440 A | * | 4/1998 | West .............................. | 717/4 |
| 5,913,063 A | * | 6/1999 | McGurrin et al. ........... | 395/702 |
| 6,003,040 A | * | 12/1999 | Mital et al. .................. | 707/103 |
| 6,052,515 A | * | 4/2000 | Bruckhaus ............. | 395/500.02 |
| 6,061,515 A | * | 5/2000 | Chang et al. ................... | 717/2 |
| 6,182,024 B1 | * | 1/2001 | Gangopadhyay et al. ..... | 703/22 |
| 6,317,869 B1 | * | 11/2001 | Adl-Tabatabai et al. ....... | 717/3 |

OTHER PUBLICATIONS

Jia et al. A Generic Approach of Static Analysis for Detecting Runtime Errors in Java Programs. IEEE. 1999. pp. 67–72.*

Papageorgiou et al. A Pattern Classification Approach to Dynamical Object Detection. IEEE. 1999. pp. 1223–1228.*

Wilson, P., "Uniprocessor Garbage Collection Techniques", Proceedings of the International Workshop on Memory Management, St. Malo, France, Sep. 1992, Lecture Notes in Computer Science, vol. 637, Springer–Verlag (1992) pp. 1–42.

De Pauw, et al., "Jinsight 1.0, Visualizing the Execution of Java Programs", IBM Corp., Research Division, http://www.alphaWorks.ibm.com/formula/jinsight, Apr. 9, 1998.

De Pauw, et al., "Jinsight 1.1, Visualizing the Execution of Java Programs", IBM Corp., Research Division, http://www.alphaWorks.ibm.com/formula/jinsight, Oct., 1998.

"OptimizeIt", Intuitive Systems, Inc., described at http://www.Optimizeit.com (1999).

(List continued on next page.)

Primary Examiner—Tuan Q. Dam
Assistant Examiner—Wei Zhen
(74) Attorney, Agent, or Firm—F. Chau & Associates, LLP

(57) ABSTRACT

Methods are provided for extracting reference patterns in JAVA and depicting the same. The extracted and depicted reference patterns may be used to interactively and selectively explore data structures, and to identify and solve memory leaks. A method for extracting reference relationships among objects corresponding to a running program includes the step of designating a starting set of objects. The starting set of objects is partitioned into subsets of objects grouped by class. A recursive operation is applied to each of the starting subsets. The recursive operation includes the step of, given a subset of objects, identifying a second set of objects. The second set includes all objects that refer to at least one object in the subset when a direction of reference terminates at the starting set. Alternatively, the second set includes all objects that are referred to by at least one object in the subset when the direction of reference originates from the starting set. The recursive operation also includes the step of partitioning the second set into new subsets of objects grouped by class. The recursive operation is applied to each of the new subsets until a predefined depth is reached.

26 Claims, 15 Drawing Sheets

OTHER PUBLICATIONS

De Pauw, et al., "Visualizing Reference Patterns for Solving Memory Leaks in Java" submitted Nov. 1998 for European Conference on Object Oriented Programming, to be held in Lisbon from Jun. 13–18, 1999.

Evans, D., "Static Detection of Dynamic Memory Errors", Programming Language Design and Implementation, May 1996, ACM SIGPLAN Notices 31, (5), pp. 44–53.

Blanchet, B., "Escape Analysis: Correctness Proof, Implementation and Experimental Results", ACM SIGPLAN–SIGACT, Proceedings of the 25th Annual Symposium on Principles of Programming Languages, San Diego, CA, Jan. 1998, pp. 25–37.

Foote, W., "HAT—The Java Heap Analysis Tool", Sun Microsystems, Inc., http://developer.java.sun.com/developer/early Access/hat/readme.htm (1998).

Jprobe, KL Group, Inc., described at http://www.klgroup.com/jprobe/profiler/memory.htm (1999).

De Pauw, et al., "Execution Patterns in Object–Oriented Visualization", USENIX Association, Proceedings of the Fourth USENIX Conf. On Object–Oriented Technologies and Systems (COOTS), Apr. 27–30, 1998, pp. 219–234.

De Pauw et al., "Visualizing the Behavior of Object–Oriented Systems", SIGPLAN Notices (Proc. Of OOPSLA, 8th Conference), Issue vol. 28, No. 10, 1993, pp. 326–337.

* cited by examiner

METHODS FOR EXTRACTING REFERENCE PATTERNS IN JAVA AND DEPICTING THE SAME

BACKGROUND

1. Technical Field

The present invention relates generally to computer processing systems and, in particular, to methods for extracting reference patterns in JAVA and depicting the same. The extracted and depicted reference patterns may be used to explore data structures in JAVA, as well as to identify and solve memory leaks.

2. Background Description

Complexity in software systems is still growing significantly. Modern languages like JAVA take away some of the burden of memory management by offering automatic garbage collection. In languages having garbage collection, a garbage collector periodically frees all the objects that can no longer be "reached" from the running program. For articles describing garbage collection in software languages, see "Uniprocessor Garbage Collection Techniques", P. Wilson, Proceedings of the International Workshop on Memory Management, St. Malo, France (September 1992), Lecture Notes in Computer Science, Vol. 637, pp. 1–42, Springer-Verlag (1992); and "Garbage Collection", Jones et al., John Wiley and Sons (1996).

Garbage collection, however, can be a double-edged sword. Programmers may get the false impression that they don't have to worry about memory when using a garbage-collected language. Unfortunately, many JAVA programs run out of memory unexpectedly after performing a number of operations. Quite often, this is the result of what is referred to as a memory leak. In JAVA, a memory leak is caused when a first object cannot be reclaimed because another object is still unintentionally referring to the first object, even though the first object is no longer needed. Memory leaks can be difficult to solve, since the complexity of most programs prevents us from manually verifying the validity of every reference. Thus, even in JAVA, programmers need a way to identify leaking objects, and to tackle the more difficult task of discovering who is holding on to these objects and why.

Memory leaks often occur according to a simple scenario, which will now be described. In the scenario, there is a self-contained operation (for example, the display of a temporary dialog window) in which temporary objects are created, as shown in FIG. 1. By the end of the operation (in this example when the dialog window is closed) we expect all of these temporary objects to be released. Only some, however, are actually released. Many programs with memory leaks fit this pattern in one way or another.

A program reaches a stable state; its object population 102 is shown in the lower area in the figure. Then we perform a temporary operation such as, for example, opening a dialog window. The new objects 104 allocated for this operation are shown in the upper area. When the user closes the window, the program will typically set the reference 106 between the old objects (lower view) and the new objects (upper view) to null. Ideally, the next garbage collection will then clean up all the new objects which were associated with the window.

What happens very often, however, is that during such a temporary operation, other old objects may get to know about some of the new objects. This situation is shown in FIG. 2, which is a diagram illustrating memory leaks caused by vestigial references. A typical case is a registry 202 (in the lower area of the figure) that acquires a reference 204 to a new object 206. The programmer may not be aware of this hidden reference, and fail to set this reference to null at the end of the operation. As a result the garbage collector will not reclaim some objects that were meant to be collected after the temporary operation has finished.

Even when we have identified leaking objects and references to them, some further exploration will usually be required by the programmer in order to fully understand the results. For example, the programmer may want to dig deeper and understand why an object was created in the first place, or distinguish true leaks from artifacts like cached objects which are retained intentionally. Searching through individual object references is not practical in anything but the simplest program, given the large number of objects and the richness of their interconnections in most programs.

Accordingly, it would be desirable and highly advantageous to have methods for extracting reference patterns in JAVA and depicting the same. Moreover, it would be desirable and highly advantageous to have a method for exploring data structures. Further, it would be desirable and highly advantageous to have methods for identifying and solving memory leaks in JAVA, as well as distinguishing true memory leaks from artifacts (e.g., cached objects) which are retained intentionally.

SUMMARY OF THE INVENTION

The present invention is directed to methods for extracting reference patterns in JAVA and depicting the same. The extracted and depicted reference patterns may be used to interactively and selectively explore data structures, identify and solve memory leaks, and distinguish true memory leaks from artifacts.

In one aspect of the present invention, a method for extracting reference relationships among objects corresponding to a running program includes the step of designating a starting set of objects. The starting set of objects is partitioned into subsets of objects grouped by class. A recursive operation is applied to each of the starting subsets. The recursive operation includes the step of, given a subset of objects, identifying a second set of objects. The second set includes all objects that refer to at least one object in the subset when a direction of reference terminates at the starting set. Alternatively, the second set includes all objects that are referred to by at least one object in the subset when the direction of reference originates from the starting set. The recursive operation also includes the step of partitioning the second set into new subsets of objects grouped by class. The recursive operation is applied to each of the new subsets until a predefined depth is reached.

In another aspect of the present invention, a method for representing relationships among objects corresponding to a running program includes the step of representing a reference between a first set of objects grouped by class and a second set of objects grouped by class using a first visual syntax, when each of the objects in the second set refer to at least one object in the first set. A direction of the reference between the first and second sets is represented using a second visual syntax.

In yet another aspect of the present invention, a method for displaying references to leaking objects corresponding to a temporary operation in a running program includes the step of inventorying a first set of objects corresponding to objects in an object heap at a point in time preceding the performance of the temporary operation, a second set of objects corresponding to objects in the object heap at a point in time following the performance of the temporary operation, references between the objects of the second set, and references starting from non-JAVA sources to the objects of the second set. Identifiers associated with the objects in the first set of objects are compared to identifiers associated with the objects in the second set of objects to identify a third set of objects corresponding to the objects in the second set of objects that are not in the first set of objects. The references to the objects in the third set of objects are displayed.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to methods for extracting reference patterns in JAVA and depicting the same. The extracted and depicted reference patterns may be used to interactively and selectively explore data structures. Moreover, the reference patterns may be used to identify and solve memory leaks, as well as distinguishing true memory leaks from artifacts (e.g., cached objects) which are retained intentionally.

To facilitate a clear understanding of the present invention, definitions of terms employed herein will now be given. In JAVA, a memory leak refers to a first object that cannot be reclaimed because another object is still unintentionally referring to the first object, even though the first object is no longer needed. A reference pattern is a concise way to represent the interconnections among large numbers of objects. Reference patterns are described in further detail with respect to FIGS. 4–6.

Figure 3:
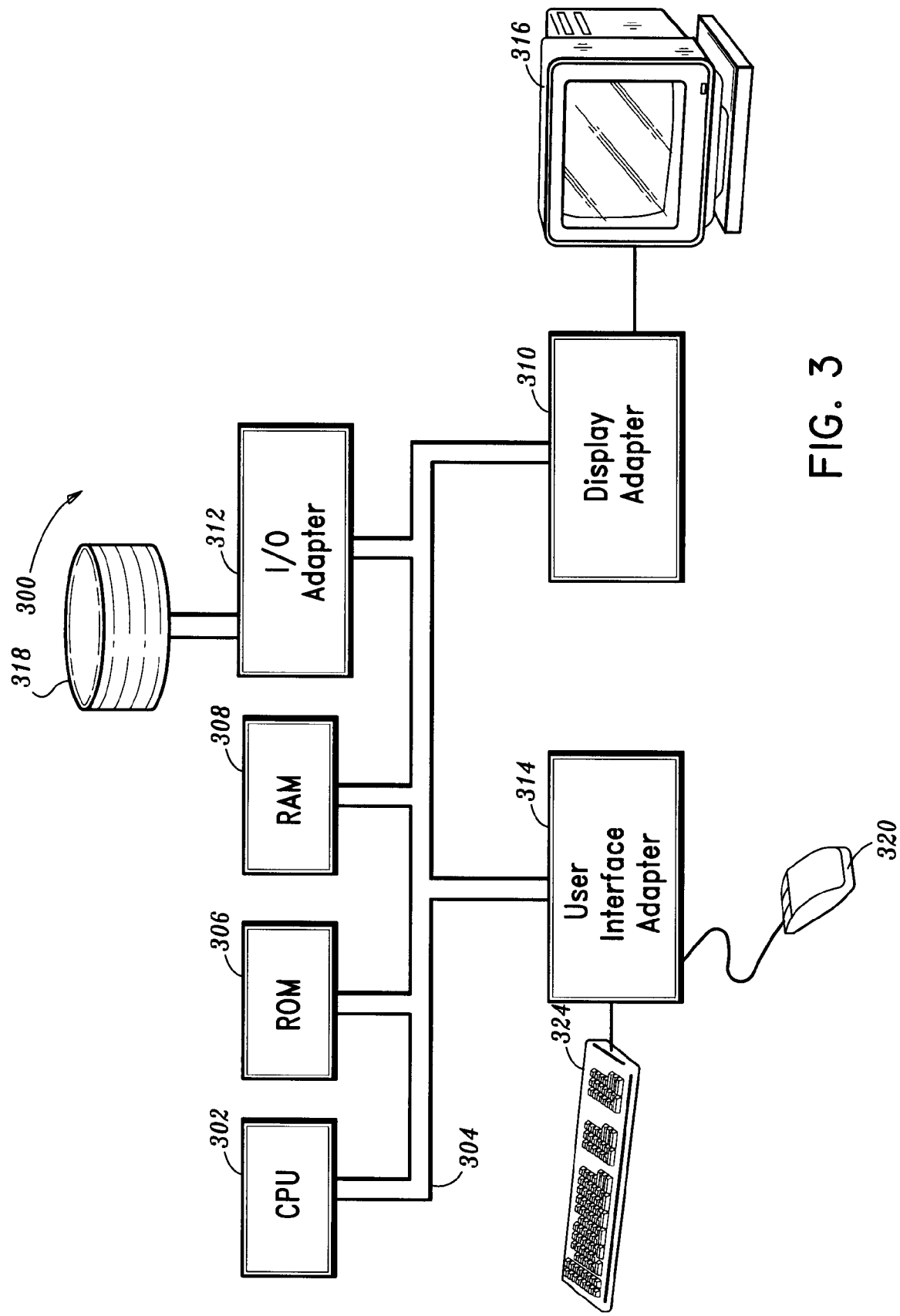
FIG. 3 is a block diagram of a prior art general-purpose computer system to which the present invention may be applied.

FIG. 3 is a block diagram of a prior art general-purpose computer system 300 to which the present invention may be applied. The computer system 300 includes at least one processor (CPU) 302 operatively coupled to other components via a system bus 304. A read only memory (ROM) 306, a random access memory (RAM) 308, a display adapter 310, an I/O adapter 312, and a user interface adapter 314 are coupled to system bus 304.

A display device 316 is operatively coupled to system bus 104 by display adapter 310. A disk storage device (e.g., a magnetic or optical disk storage device) 318 is operatively coupled to system bus 304 by I/O adapter 312. A mouse 320 and keyboard 324 are operatively coupled to system bus 304 by user interface adapter 314. One or more objects are created when an Object-Oriented Program (not shown) is executed in computer system 300.

To implement certain aspects of the present invention, a two part system is used. The first part corresponds to a JAVA Virtual Machine instrumented for Jinsight (hereinafter "JVM"). The second part corresponds to a reference pattern extractor, visualizer, and memory leak algorithm which are part of Jinsight (hereinafter "visualizer"). Jinsight is a research tool for visualizing and exploring many different aspects of a JAVA program's run-time behavior. To use Jinsight, the programmer first runs the target program using an instrumented JAVA Virtual Machine, which can produce traces of various types of information about the program's execution. The Jinsight visualizer can then be used to explore the program's behavior from various angles. For a more detailed description of Jinsight, see "Jinsight, A Visual Tool for Optimizing and Understanding JAVA Programs", De Pauw et al., IBM Corporation, Research Division (1998), found at http://www.alphaWorks.ibm.com/formula/jinsight. The use of Jinsight in accordance with various aspects of the present invention will be described in further detail hereinbelow. It is to be appreciated that Jinsight may be executed in the same computer as the target program. Alternatively, the visualizer may be executed on a separate computer from that executing the target program.

A description of a method for generating reference patterns according to the present invention will now be given. As stated above, reference patterns are a concise way to represent the interconnections among large numbers of objects. They are particularly useful for programs having large data spaces and considerable repetition in their data structures. Reference patterns allow us to work with the essential structure of a data space in a simplified, aggregated form. Reference patterns make repetitive structures more understandable by eliminating redundancy and bringing out their inherent structure.

The reference pattern extraction scheme of the present invention produces a concise representation of the references among groups of objects. The scheme may be modified to show references to or from a user-defined starting set of objects. The output of the pattern extraction scheme is a forest of trees, the trees extracted from the directed graph of object references leading in some way to the starting set. The root of each tree represents all objects of a single class in the starting set. Each node of a tree represents all objects of a single class that refer to at least one of the objects represented by the parent of this node. In other words, objects are grouped by a combination of class and what actual objects they refer to (or are referred to by). However, it is to be appreciated that class is but one preferred example of user defined criteria that may be implemented to group objects according to the present invention. Given the teachings of the invention provided herein, one of ordinary skill in the related art will be able to contemplate these and similar implementations of the elements of the invention. For example, instead of grouping objects by class, they may be grouped by package. The present invention affords a user the utmost flexibility in defining the basis for grouping objects together.

Figure 4:
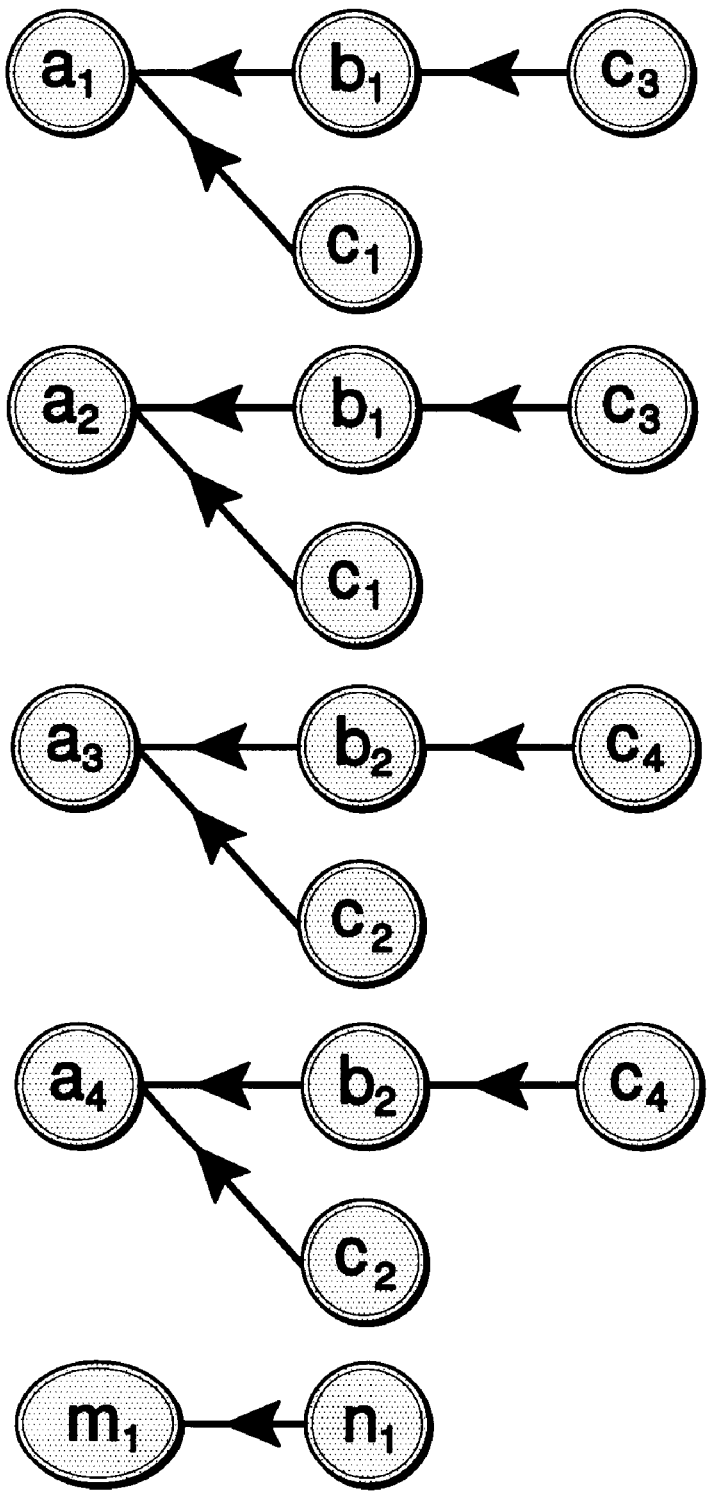
FIG. 4 is a diagram illustrating objects and references prior to reference pattern extraction.
Figure 5:
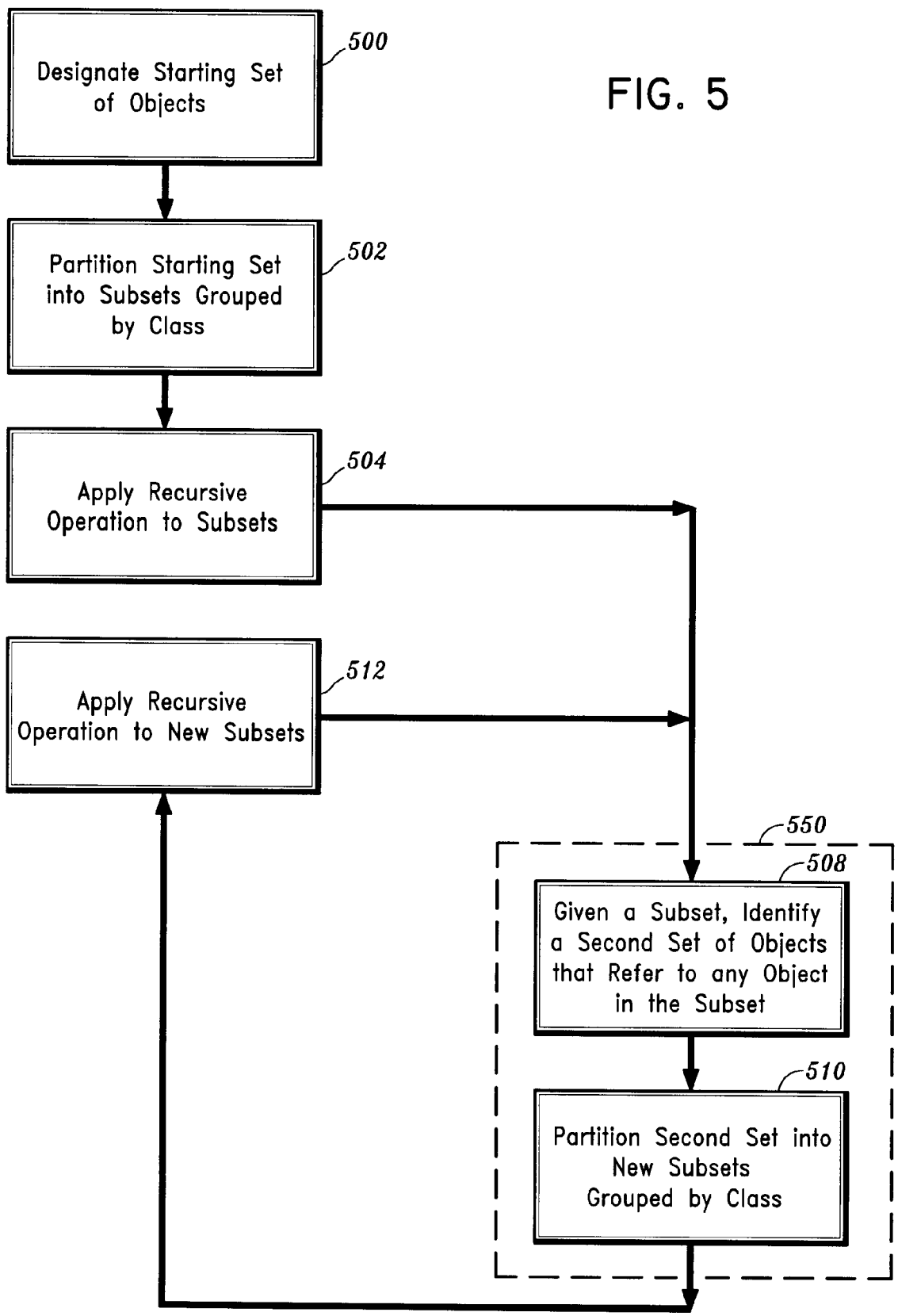
FIG. 5 is a flowchart of a method for extracting reference patterns according to an embodiment of the present invention.
Figure 6:
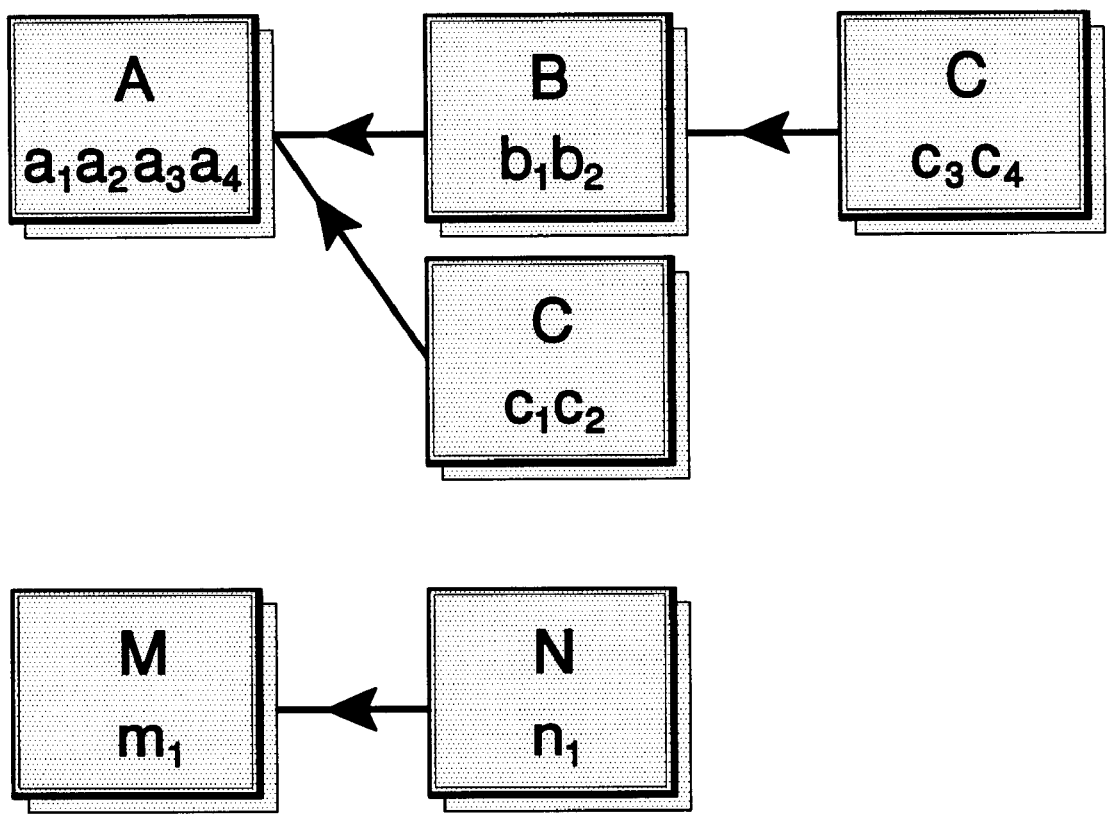
FIG. 6 is a diagram illustrating the objects and references of FIG. 4 after reference pattern extraction has been performed according to an embodiment of the present invention.

An example of reference pattern extraction will now be given with respect to FIGS. 4, 5, and 6. FIG. 4 is a diagram illustrating objects and references prior to reference pattern extraction. FIG. 5 is a flowchart of a method for extracting reference patterns according to an embodiment of the present invention. FIG. 6 is a diagram illustrating the objects and references of FIG. 4 after reference pattern extraction has been performed according to an embodiment of the present invention.

In FIG. 4, the actual structure of the data is shown, where a1, . . . , a4 are instances of class A, b1, . . . , b4 are instances of class B, and so forth. In this example, the user would like to see the pattern of references to objects of class A and to objects of class M, corresponding to the objects of the starting set.

According to the method of FIG. 5, a user designates a starting set of objects (a1, a2, a3, a4, m1) (step 500). The starting set is then partitioned into subsets of objects A (a1, a2, a3, a4) and M (m1), grouped by class (step 502) as shown in FIG. 6. Each of these subsets will become the root of a reference pattern tree.

According to step 504, a recursive operation 550 is now applied to subsets A (a1, a2, a3, a4) and M (m1). For the first subset A (a1, a2, a3, a4), we identify the objects that refer to at least one of the objects of this subset (step 508), and this gives us the "second" set (b1, b2, c1, c2). We now partition this set (b1, b2, c1, c2) into new subsets grouped by class (step 510). The result is a set B (b1, b2) and a set C (c1, c2), as shown in FIG. 6. According to step 512, the recursive operation 550 is applied with B (b1, b2) as our subset. The objects that refer to B (b1, b2) are (c3, c4), and since they all belong to the same class, partitioning them gives only one new subset, C (c3, c4), as shown in FIG. 6. Next we identify objects pointing to the set C (c1, c2). In this case, there are no objects pointing to the set C (c1, c2). Therefore, the node for C (c1, c2) in FIG. 6 does not have any set pointing to it. The same holds true for C (c3, c4). For the second subset M(m1) (from the starting set), there is only one object, n1, pointing to it, which gives us the set N (n1) as shown in FIG. 6.

Rather than looking at patterns of references to objects of a given starting set, it is also possible to reverse the sense of the pattern extraction to bring out the structure of references emanating from a starting set. This can be done by simply replacing the occurrence of "refer to" in step 508 with "are referred to by". Each node would contain all the objects of a given class that are referred to by an object in the parent node. Applications of this type of reference pattern extraction are described in more detail below.

A description of a visual syntax for representing relationships among objects according to the present invention will now be given. In particular, the visual syntax may be used to represent the extracted reference patterns described above. However, it is to be appreciated that the syntax may be used to represent other information related to an object or a group of objects. In preferred embodiments of the present invention as described below, the visual syntax corresponds to an interactive visual representation.

Figure 7:
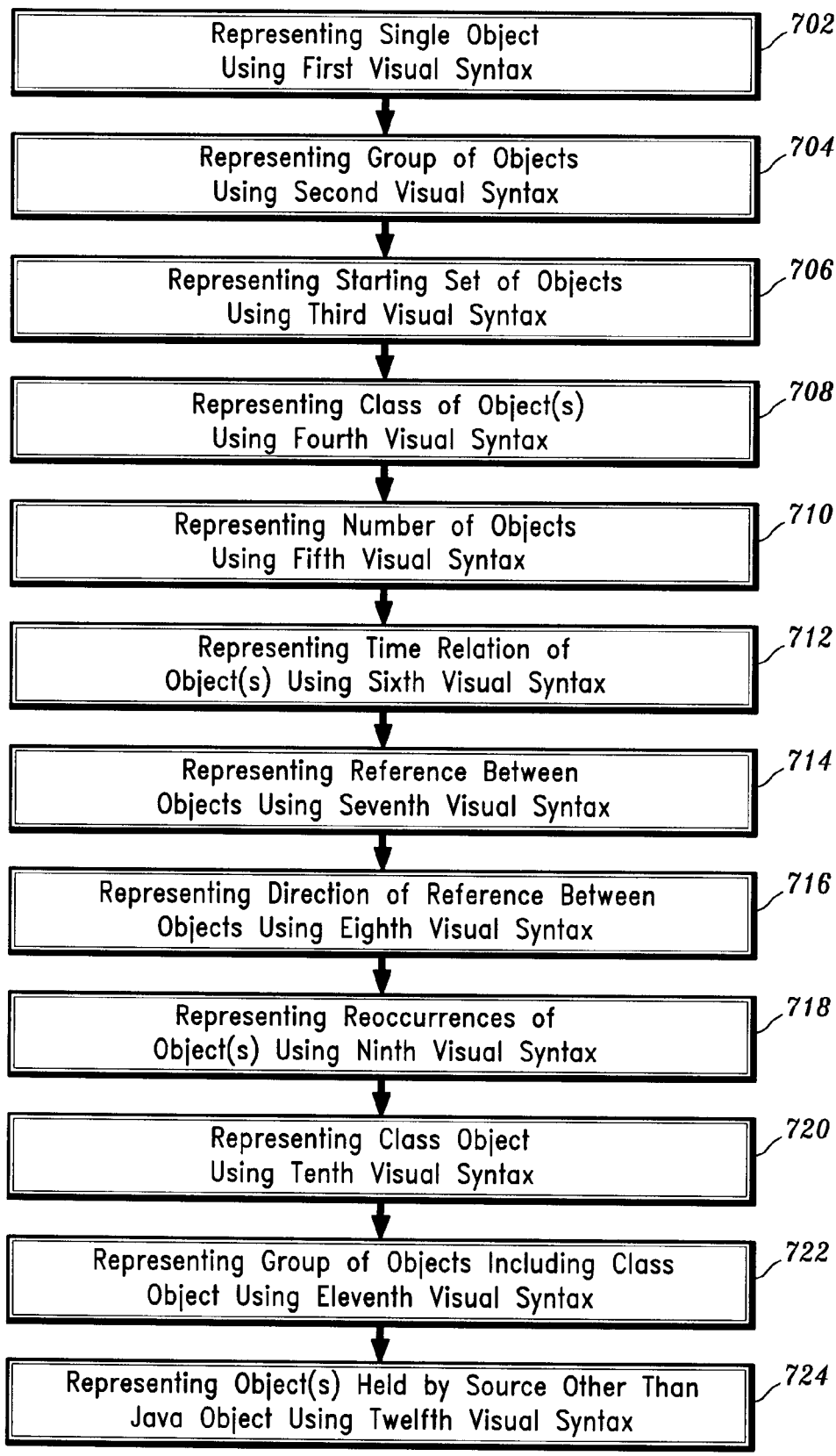
FIG. 7 is a flowchart of a method for representing reference patterns among objects corresponding to a running program according to an embodiment of the present invention.
Figure 8:
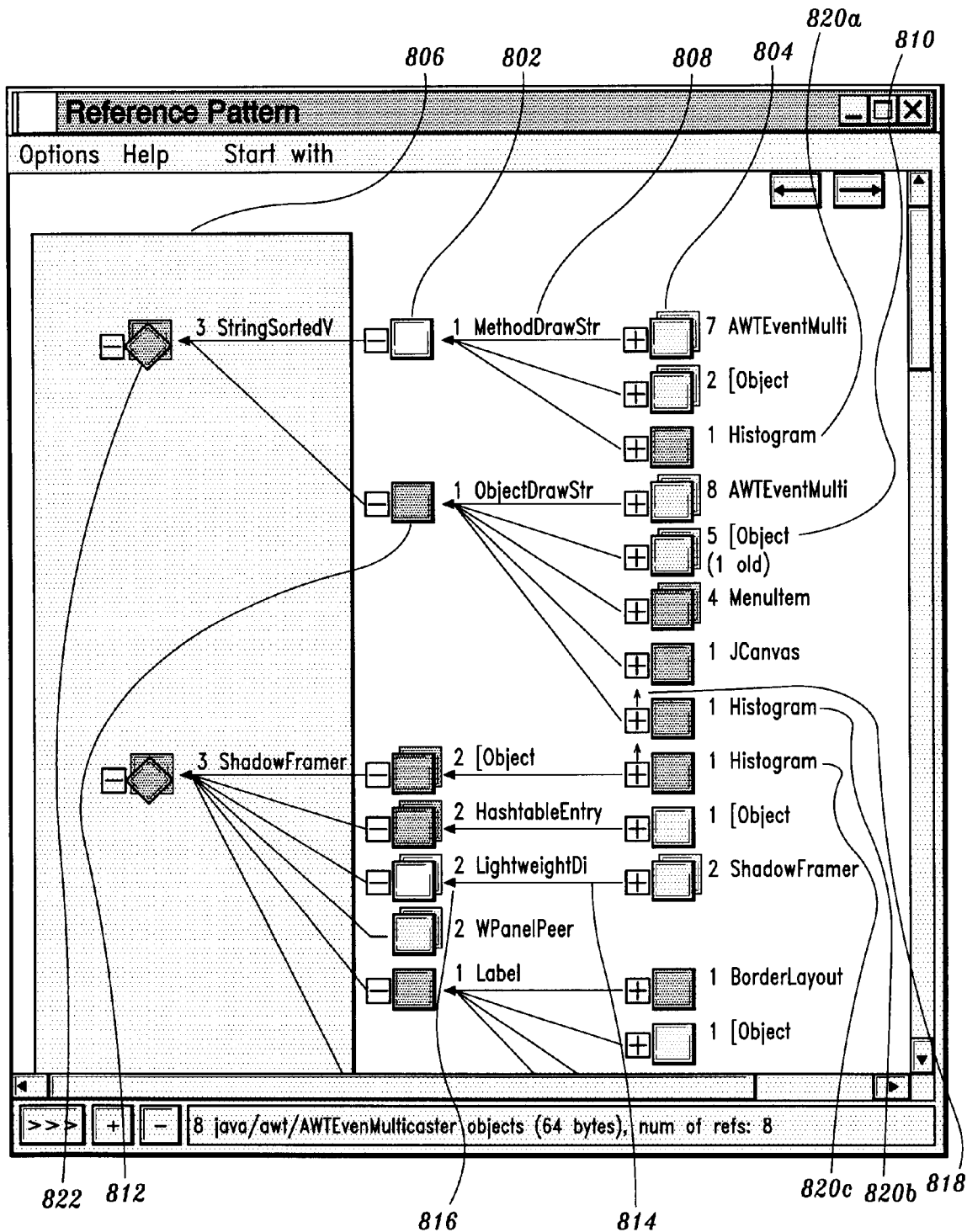
FIG. 8 is a diagram illustrating reference patterns among objects according to the method of FIG. 7.

FIG. 7 is a flowchart of a method for representing reference patterns among objects corresponding to a running program according to an embodiment of the present invention. FIG. 8 is a diagram illustrating reference patterns among objects according to the method of FIG. 7. In the example corresponding to FIGS. 7 and 8, the starting set is the set of new objects that were created but not collected during the period of the temporary operation (i.e., the leaking objects). The reference pattern extraction algorithm is applied to this set, so that it can be determined who is referring to these objects (i.e., who is causing the leaks).

In general, the method of FIG. 7 describes a visual syntax for representing reference patterns among objects. The phrase "visual syntax" as used herein corresponds to visual indicia used to represent, for example, an object(s), characteristics associated with the object(s), and relationships among objects. The specific visual indicia shown and described with respect to FIG. 8 are merely illustrative and, thus, other visual indicia may be substituted therefore.

A single object is represented using a first visual syntax (step 702). The first visual syntax, as shown in FIG. 8, consists of a single icon, in particular, a square 802. A group of objects is represented using a second visual syntax (step 704) corresponding to two icons, in particular, twin squares 804. Starting sets of objects grouped by class are represented using a third visual syntax (step 706) corresponding to a gray area 806, as shown in FIG. 8. Each icon in the gray area is the root of a reference pattern tree, which expands to the right.

The class of an individual object, or of all the objects in a group, is represented using a fourth visual syntax (step 708) corresponding to the color of the single square 802 or twin squares 804, and also to the text of a label 808 associated with the single square 802 or twin squares 804. The number of objects in a group is represented using a fifth visual syntax (step 710) corresponding to a number at the beginning of the label 808 associated with the twin squares 804. Note that for individual objects (represented by a single square 802), the number at the beginning of the label 808 is always one.

The fact of whether the creation of a single object precedes or occurs during a temporary operation, or whether a group of objects includes at least one old object or all new objects, is represented using a sixth visual syntax (step 712) corresponding to the color of the label 808 associated with the single square 802 or twin squares 804, respectively. For single objects, the color red is used to indicate that the object is old (i.e., that it was created before a temporary operation), and the color black is used to indicate that the object is new (i.e., that it was created during the temporary operation). For a group of objects, the color red is used to indicate that there exists at least one old object in the group, and the color black is used to indicate that the group includes only new objects.

These cues are intended to make it easier to find the offending reference causing a memory leak. In this example, one object in a group of objects 810 (labeled in red) of the class "[Object" is still pointing to an object 812 labeled in black, preventing that object 812 from being collected.

A reference between one object (single square) or group of objects (twin squares) to another object or group of objects is represented using a seventh visual syntax (step 714) corresponding to a line 814 interconnected therebetween. It is to be appreciated that a reference from a first object or group of objects to a second object or group of objects is depicted only if the objects of the first group are of the same class and each references at least one object in the second group of objects. It is the imposition of these two characteristics in referencing among objects that allows for complex data structures to be explored as described hereinbelow. Note that while all the objects in the second group are of the same class, they do not have to be of the same class as the objects in the first group.

The direction of reference between groups of objects is represented using an eighth visual syntax (step 716) corresponding to an arrowhead 816 located at end of the seventh visual syntax (i.e., the line 814). In this example, the direction of reference is from right to left and, thus, the corresponding arrowheads in FIG. 8 point from right to left. The direction can be also reversed to show the pattern of references from (rather than to) the starting set. In such a case, the arrowheads would point from left to right.

Figure 9:
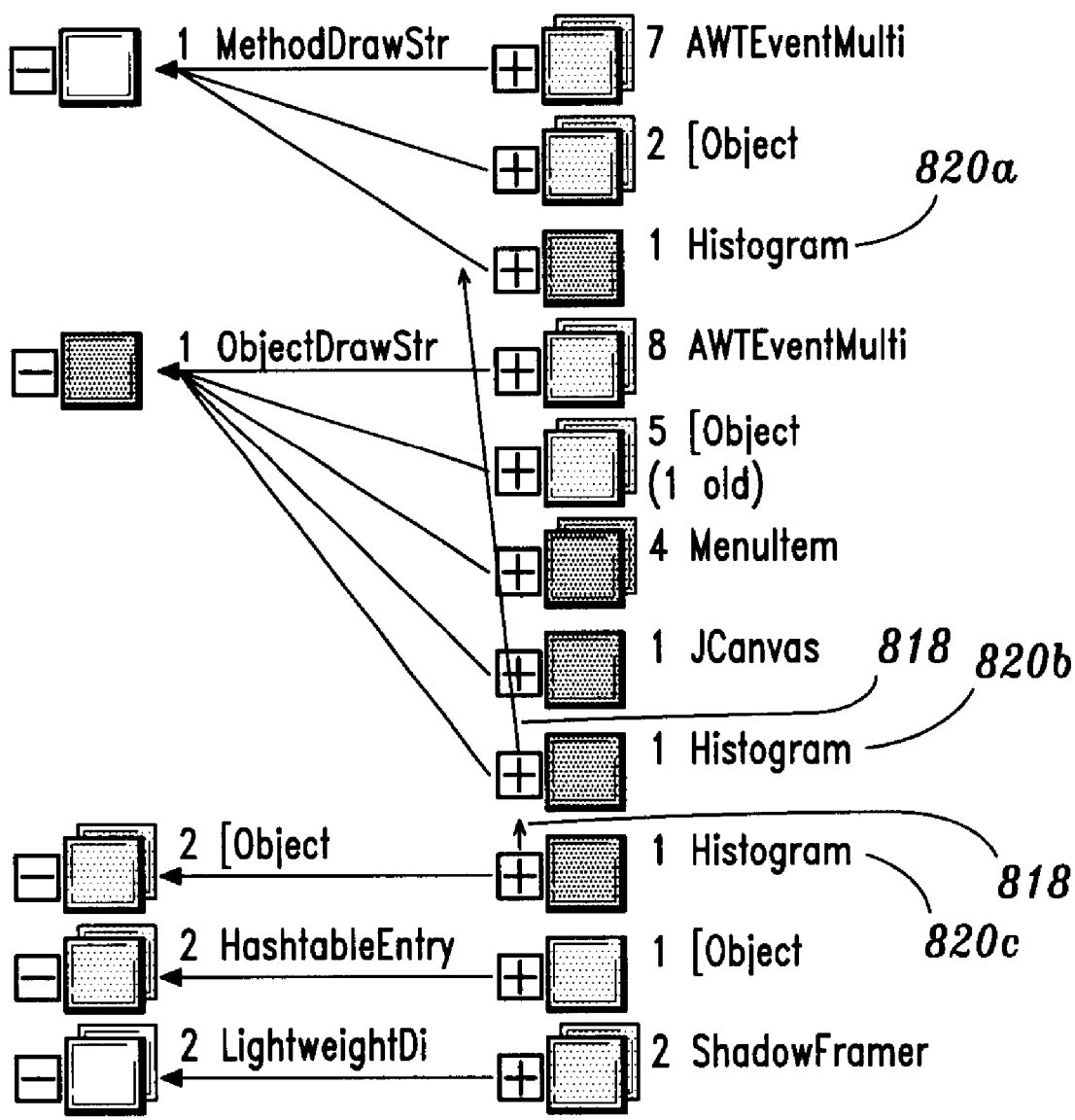
FIG. 9, which is a diagram illustrating how an expansion is made to the first occurrence of an object that appears more than once according to an embodiment of the present invention.

References between objects form a directed graph. Because the visual layout we have chosen is a set of trees rather than a graph, the same node can appear more than once in a view. An occurrence of a group of objects (node) other than a first occurrence is represented using a ninth visual syntax (step 718) corresponding to a blue arrow 818 to the left of the icon, pointing upward. An example is shown in FIG. 8, where a single Histogram object (in purple) appears three times (820*a*, 829*b*, and 820*c*) in the view. Clicking on the (upwardly pointing) blue arrow 818 of, for example, the second occurrence 820*b* will expand it to point to the first occurrence 820*a* of this set of objects, as shown in FIG. 9, which is a diagram illustrating how an expansion is made to the first occurrence of an object that appears more than once according to an embodiment of the present invention.

Figure 15:
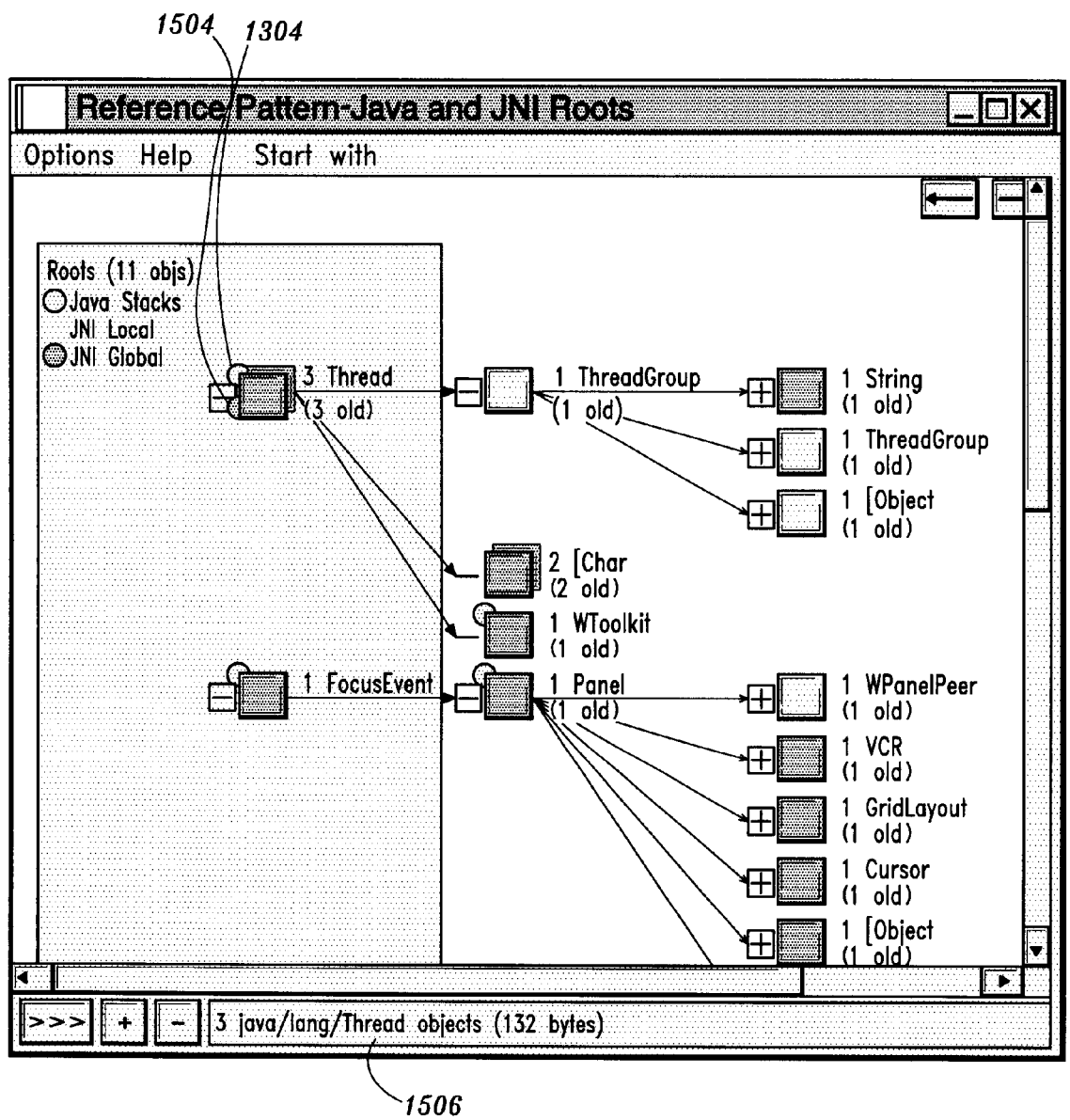
FIG. 15 is a diagram illustrating objects pinned by JAVA local variables and JNI (JAVA Native Interface) roots according to an embodiment of the present invention.

A class object, which contains the static members of a class, is represented using a tenth visual syntax (step 720) corresponding to a diamond shaped icon 822 (not shown). A group of objects that include the class object is represented using an eleventh visual syntax (step 722) corresponding to a diamond shaped icon with a single square behind it 822. A group of objects (as well as a single object) held in memory by a source other than a JAVA object (e.g., a local variable on the stack or a native method) is represented using a twelfth visual syntax (step 724) corresponding to a circle adjacent to the icon used to represent one or more objects. The twelfth visual syntax is shown in FIG. 15.

Each icon (e.g., single square, twin squares, diamond, and diamond and square combination) in the view represents a group of objects of the same class, with the same pattern of references. In other words, each is a node in the reference pattern tree. Each node is labeled with the class and the number of objects it represents. Using an input device such as mouse 320 and flying over each icon with the cursor will show more detailed information about the object(s) in the group in the status line 1506 below.

The present invention allows for the expansion and collapse of trees (or subtrees) to enhance navigation among the objects. Expansion and collapsing of trees (or subtrees) may be achieved by graphically selecting an object group's graphical representation (e.g., twin squares) By default, each tree is shown expanded to an abbreviated depth, which may be set by the user. Every node in the tree (or subtree) which is marked with "+" may be expanded individually by clicking there. On the other hand, every node in the tree (or subtree) which is marked with "−" may be collapsed individually by clicking there. Thus, the user may toggle between an expanded and collapsed state to explore a node without being flooded with information.

Figure 10:
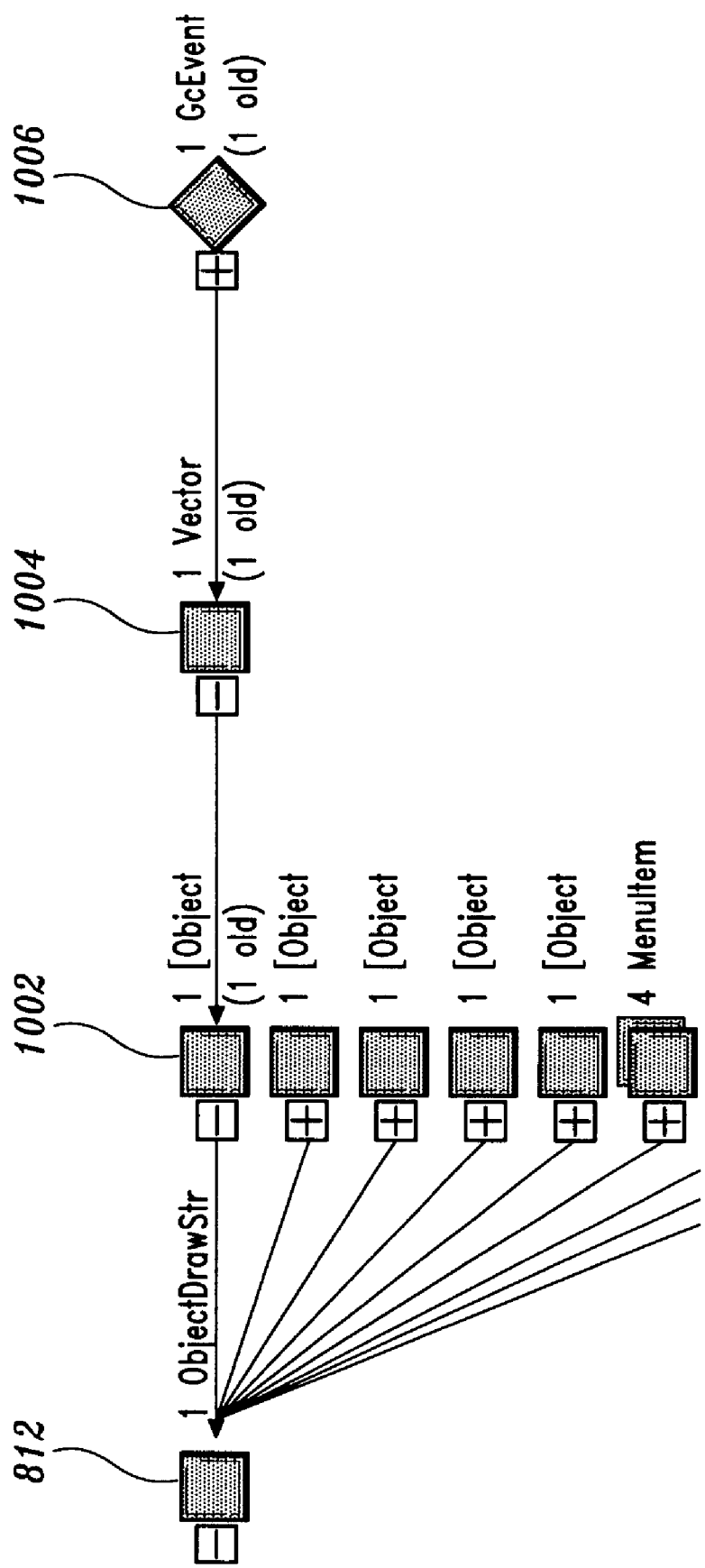
FIG. 10 is a diagram illustrating the result of ungrouping a set of five Object arrays from FIG. 8 according to an embodiment of the present invention.

While the aggregation of objects into groups is the key to uncovering patterns, sometimes this same grouping can hide important differences among individual objects. For this reason the user is allowed to "ungroup" a node to work with objects individually. The view will then show a separate icon for each of the objects in the group. To the right of each of these icons will be the pattern of references to that object only. FIG. 10 is a diagram illustrating the result of ungrouping the set of five [Object arrays 810 from FIG. 8 according to an embodiment of the present invention.

Figure 1:
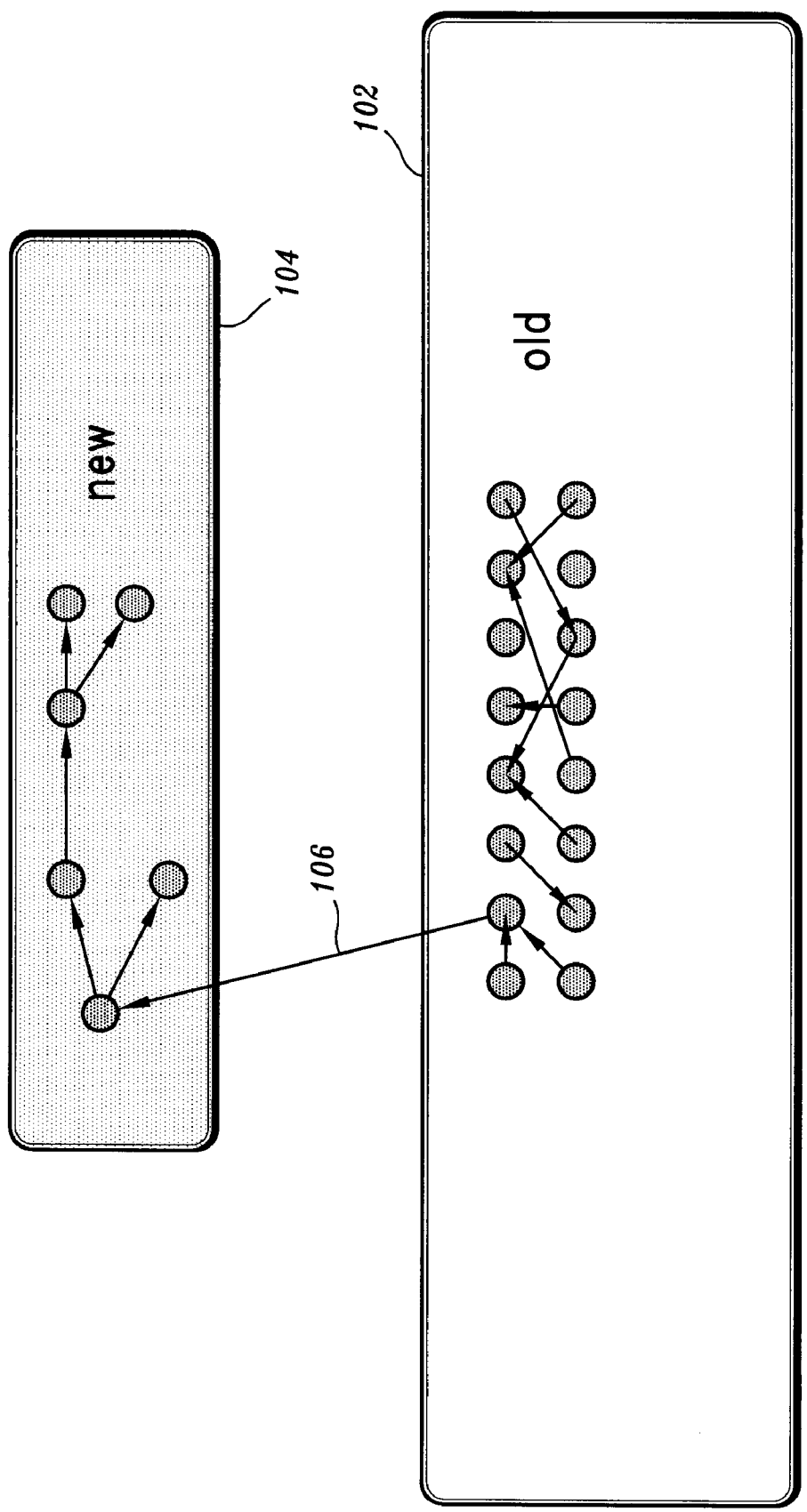
FIG. 1 is a diagram illustrating one object referring to a group of objects created during a temporary operation.
Figure 2:
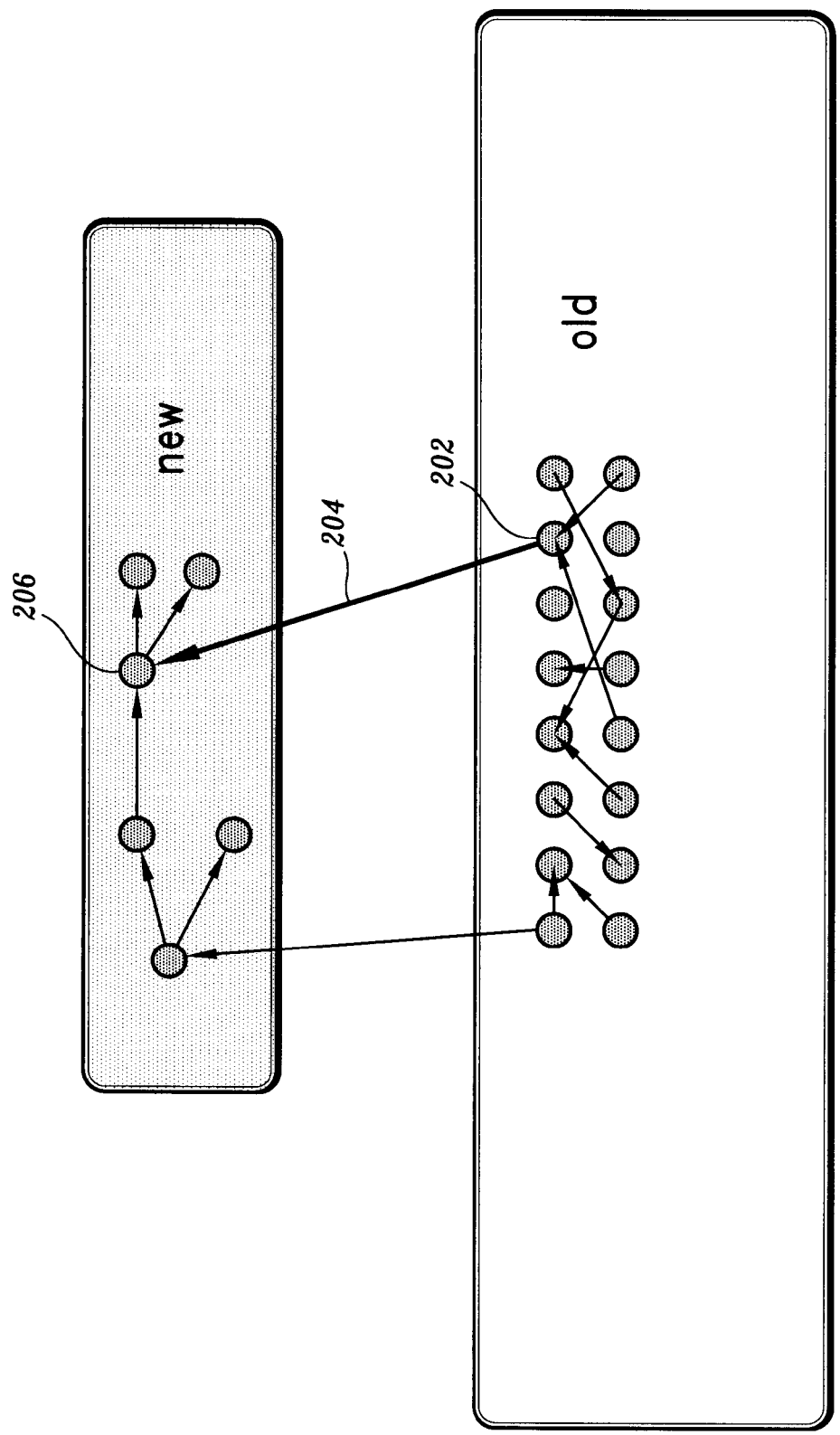
FIG. 2 is a diagram illustrating memory leaks caused by vestigial references in the scenario illustrated in FIG. 1.

A methodology for solving memory leaks according to the present invention will now be given. The methodology described immediately hereafter pertains to the basic memory leak scenario described above with respect to FIGS. 1 and 2. A methodology for solving memory leaks in other scenarios is also provided hereinbelow.

Figure 11:
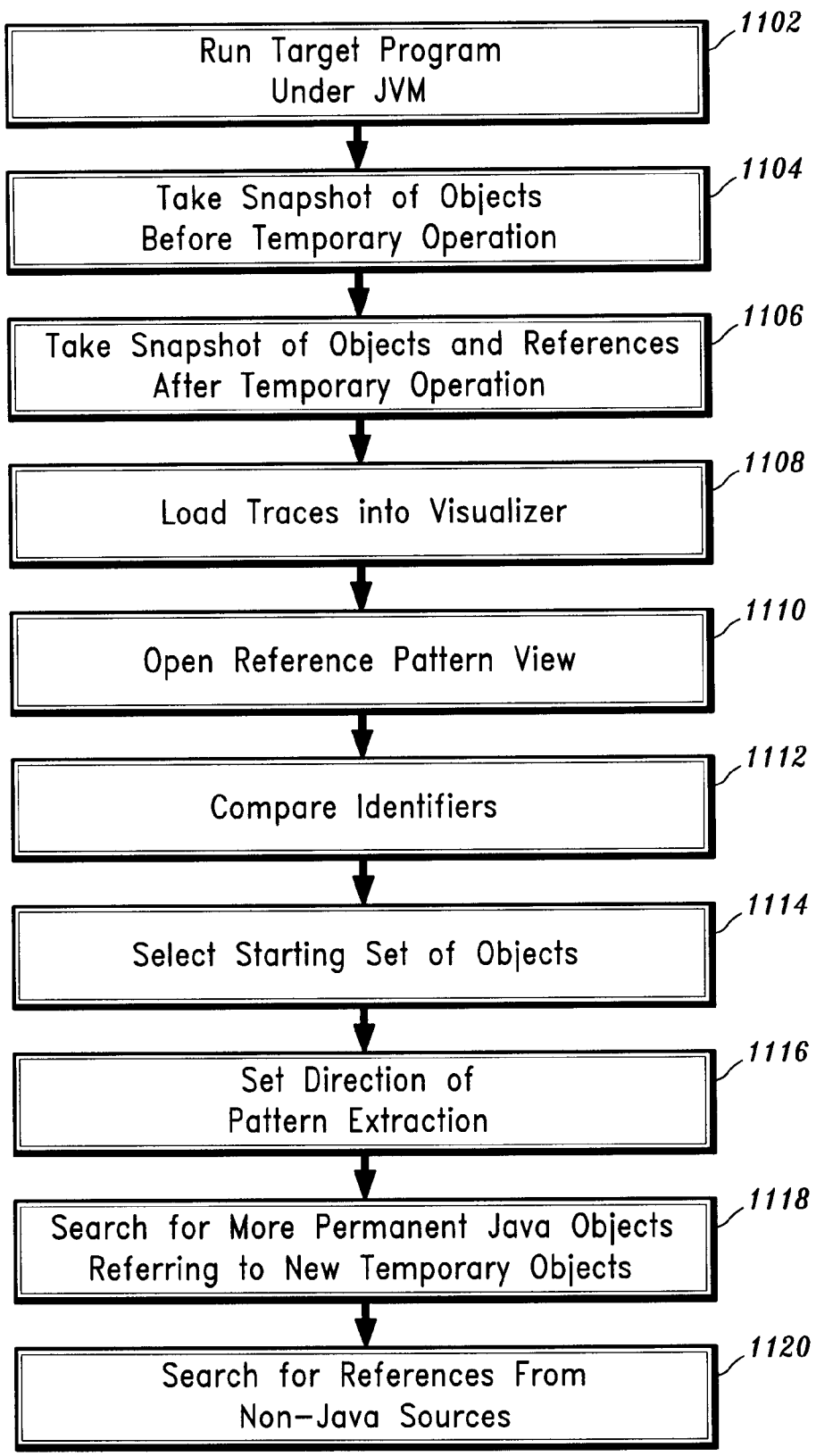
FIG. 11 is a flowchart of a method for displaying memory links to leaking objects corresponding to a temporary operation in a running program according to an embodiment of the present invention.
Figure 12:
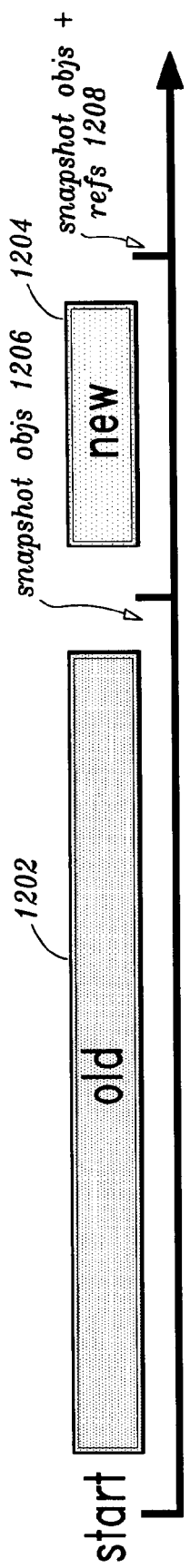
FIG. 12 is a diagram of a timeline of program execution of a temporary operation.

FIG. 11 is a flowchart of a method for displaying references to leaking objects corresponding to a temporary operation in a running program according to an embodiment of the present invention. The method of FIG. 11 is described in relation to the pattern extraction method and visual syntax described above with respect to FIGS. 5, 7, and 8. FIG. 12 is a diagram of a timeline of program execution of the temporary operation. As shown, old objects 1202 are created before the temporary operation, and new objects 1204 created during the temporary operation.

Initially, a user runs the target program under Jinsight's instrumented JAVA Virtual Machine (JVM) (step 1102). Just before the temporary operation, the user issues a command to take a snapshot 1206 of the object population of the program (step 1104). After the temporary operation, the user issues a command to take another snapshot 1208 of the object population of the program, as well as references to those objects (step 1106). The snapshots are taken using Jinsight's instrumented JVM.

Each snapshot provides an inventory of all the objects in the object heap at the time the respective snapshot was taken. Each of the objects in the heap has a unique identifier associated therewith. Thus, the objects in the object heap are inventoried with respect to their unique identifiers. It is to be appreciated that the second snapshot 1208 is performed to also capture (inventory) all the references between the objects themselves and the references starting from non-JAVA sources (such as, for example, JAVA stacks, JNI global and local roots) to JAVA objects.

It is to be further appreciated that, in both snapshots, only objects that are not garbage collectable are included. Objects that could be reclaimed if the garbage collector were to run at this time are excluded. The user then loads the traces into the Jinsight visualizer (step 1108), and opens a "Reference Pattern View" (step 1110).

The identifiers of the objects corresponding to the first snapshot 1206 are compared to the identifiers of the objects corresponding to the second snapshot 1208 (step 1112). The objects that appear new in the second snapshot 1208 (as compared to the first snapshot) are the ones that could not be collected after completion of the temporary operation (i.e., the leaking objects).

The user then selects a starting set of objects from a number of choices (step 1114). The starting set will typically be all the new objects created during the temporary operation that are still in existence afterward (i.e., the leaking objects). This starting set will then appear in the gray area 806 on the left as shown in FIG. 8.

The user then sets the direction of pattern extraction (step 1116). To look for references from old objects to new objects the user sets the direction of the pattern extraction from right to left. This is a typical, preferred method to find memory leaks.

To identify more permanent objects which are referring, directly or indirectly, to one of the new, temporary objects, the user searches on the right side of the visualization for objects with a red label 808 (these are the old objects) or for diamonds 822 (class objects) (step 1118). The example in FIG. 10 shows an old [Object 1002 referring to a new ObjectDrawStr 812, which is no longer needed and should have been reclaimed. After expanding the references, it can be seen that the old [Object 1002 is referred to by a Vector 1004, which is part of a GcEvent 1006. The source code for this example revealed that GcEvent's Vector (which has an array inside) is a registry for subscribers to that event type. The object ObjectDrawStr 812 had at one time been a subscriber to GcEvent 1006, but in this case the programmer forgot to have the ObjectDrawStr 812 cancel its subscription to that event 1006.

Figure 13:
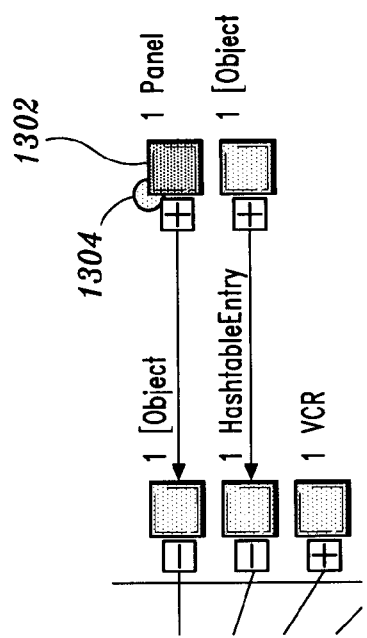
FIG. 13 is a diagram of a panel object pinned by a variable on a JAVA stack according to an embodiment of the present invention.

To identify objects held in memory by a source other than a JAVA object, such as a local variable on the stack or a native method, the user can also search for nodes marked with a colored circle (step 1120). FIG. 13 is a diagram of a panel object 1302 (with green circle 1304) pinned by a variable on a JAVA stack according to an embodiment of the present invention.

Figure 14:
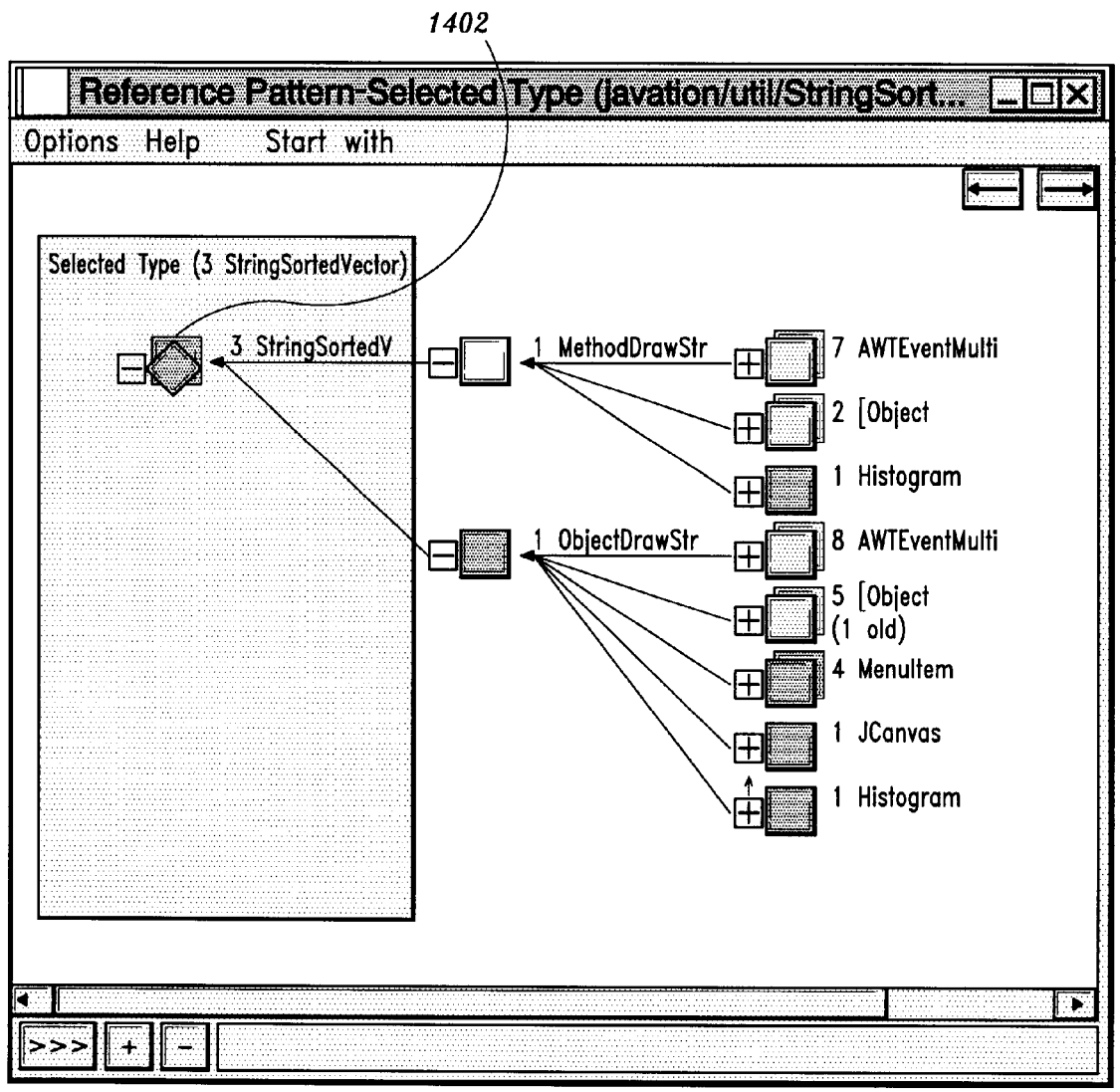
FIG. 14 is a diagram illustrating the selection of new objects of a single class as a starting set and the objects holding on to the new objects of the single class according to an embodiment of the present invention.

To determine what objects are pointing to new (leaking) objects of a particular class, the user can select just these objects as the starting set. FIG. 14 is a diagram illustrating the selection of new objects of a single class as a starting set and the objects holding on to the new objects of the single class according to an embodiment of the present invention. Thus, for example, to find out who is pointing to all the new, leaking StringSortedV objects, the user can select just these objects as the starting set.

The user may also look for references from class objects to new objects by first selecting the class objects as the starting set and then setting the direction of reference from left to right.

Typically there will be a large number of interrelated objects leaking together. In most cases, fixing one vestigial reference will have a domino effect; freeing one object will usually allow the garbage collector to free a chain of objects. Therefore, a preferred approach is to fix one problem at a time, and rerun the program after each fix before performing any further analysis.

With this in mind, it is a good idea to first focus on problems with application-level objects, since these objects will often prevent lower-level library objects from being reclaimed. The Jinsight visualizer allows the user to start with the set of new objects, where the JDK (JAVA Development Kit) and array objects have been excluded.

Thus far the approach has been to start with the objects that are leaking and then see who is pointing to them. A complementary approach is to start with the sources that could anchor objects in memory, and see which objects they are holding on to. It may be useful, for example, to look at all objects that are directly or indirectly referred to by static data members. To do this, our tool allows the user to explore reference patterns starting from the class objects. In this case, the user sets the direction of pattern extraction to look for references from, rather than to, the starting set of class objects. Similarly, the user can explore the pattern of references from local variables and from native code. FIG. 15 is a diagram illustrating objects pinned by JAVA local variables and JNI (JAVA Native Interface) roots according to an embodiment of the present invention. It is to be appreciated that different colors and different locations may be used to identify what type of non-JAVA object is pinning a JAVA object(s). For example, a green circle 1304 located at the upper left corner of an icon (e.g., single square, twin squares, diamond, diamond and square combination) may be used to identify an object(s) pinned by a variable on a JAVA stack, as shown in FIGS. 13 and 15. Further, an orange circle 1504 located at the lower left corner of an icon may be used to identify an object(s) pinned by JNI global roots. Moreover, while not shown in FIG. 15, another colored circle may be located at the middle of the left side of an icon to identify an object(s) pinned by JNI local roots.

When a vestigial reference has been found, the user may want to fix the code by setting this reference to null. If it is not immediately apparent where the appropriate place in the code is, the user may need to explore further to better understand the context of the object. One way to do this is to continue exploring with the reference pattern visualization, expanding references to or from this object to see what other objects it is connected to.

One common variation of the basic memory leak scenario is where a temporary operation is identified in which only some of the objects it creates are meant to disappear at the end, while other objects are intended to be more permanent. To solve a memory leak in this scenario, we can still apply our methodology to reveal the new objects remaining after the temporary operation. However, these new objects will now be a mix of correctly retained objects and objects that should have been released. Experience with real cases indicates that the reference pattern visualization provides an easy way to sift through these results and determine which objects are legitimately persisting and which are memory leaks. Once the leaking objects are identified, the methodology is the same as in the basic memory leak scenario for discovering the offending references to these objects.

Another very common scenario is a repetitive operation which may be causing a memory leak. For example, a server is handling requests from clients, and runs out of memory after a while. In this case, the incremental effect of one or more of these requests can be examined. In order to do that, a snapshot is taken before and after a few cycles of the repetitive operation. It can then be seen which objects were created during the interval that could not be reclaimed, and who is holding on to them. Since we are dealing with repetitive operations, it is expected that fixing the source code for one cycle will apply to all cycles.

Note also that we may have a combination of a repetitive operation and the previous scenario, where some of the objects are meant to persist beyond each cycle. Again, exploring the pattern of references visually helps differentiate the leaking objects from the others.

Besides solving memory leaks, there are many other reasons why a programmer may need to understand the data structures of a program. Some of those reasons include:

debugging, performance analysis, or understanding the way an existing program works in order to maintain it. The pattern extraction and visualization techniques described herein to manage complexity can be useful in these cases also, enabling the exploration of large, complex data structures in general.

Figure 16:
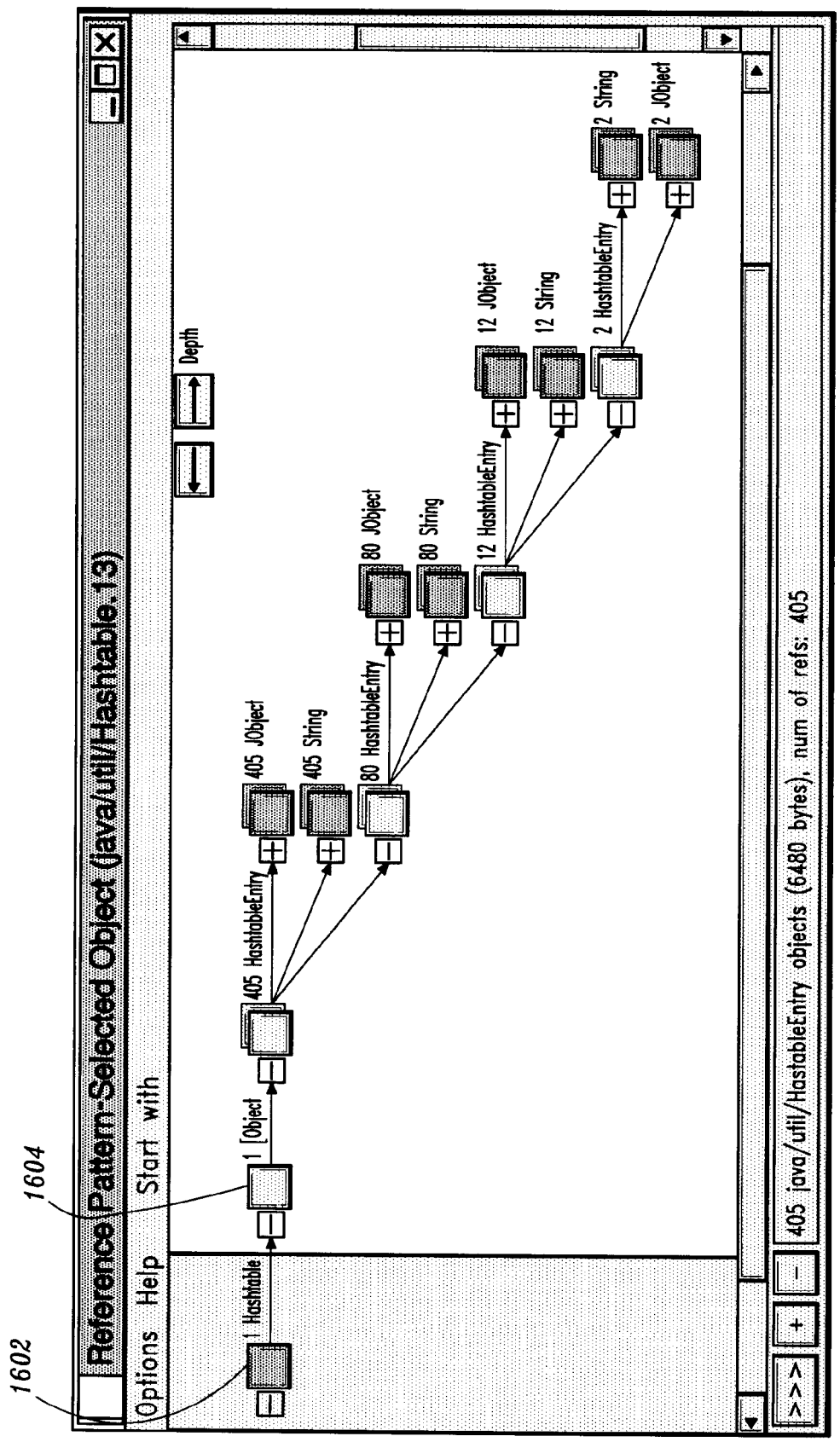
FIG. 16 is a diagram of a hashtable of objects according to the present invention.

An example is provided of how visualization of reference patterns can be used to understand the structure of a hash table. A programmer may want to look at the physical structure of a hash table to determine if a hash function is producing a balanced distribution. FIG. 16 is a diagram of a Hashtable of JObjects (values) keyed by Strings, according to an embodiment of the present invention. This particular hash table is composed of about 1500 objects.

To begin, the user selects the Hashtable object 1602 as the starting set. The user then sets the direction of arrows to point from left to right, to see the pattern of references from the Hashtable object 1602. We see the Hashtable object 1602 is shown on the left, and it is referring to an array object ([Object) 1604. This array is the main table of linked lists in the hash table. Each linked list represents a hash bucket, and is composed of HashtableEntry objects (shown in green). Each HashtableEntry has a (key, value) pair, in this case (String, JObject). From the visualization it can be seen that 405 HashtableEntry elements are at the head of a linked list, 80 elements are at the second position of their list, 12 are at the third position and 2 are at the fourth position. Thus, it can be readily seen that the distribution of this hash table is reasonable, since most of the entries are at the head of their list. The user may want to explore some individual objects further by ungrouping a particular node.

A description of various actual implementations of the present invention will now be given. The visualization of reference patterns is implemented as part of the Jinsight research tool. Jinsight traces the target program using an instrumented version of the Sun JDK JAVA Virtual Machine. The user can specify various tracing options to control the type of information recorded. For the analysis of memory problems, we recommend taking snapshots of objects and references, although it is also possible in Jinsight to gather some of this information with a more detailed trace of the execution sequence. The advantage of a snapshot over full tracing is that the amount of trace information collected will usually be significantly smaller. In addition, there will be no perturbation of the running program except while the snapshots are taken, and this usually takes less than a second. This is crucial for analyzing programs that are running for long periods of time.

A description of related work will now be given. It is to be appreciated that a significant amount of work has been done on tools that perform static checking of source code. Some of these use annotations to provide ways of expressing assumptions about memory allocation, initialization and sharing, or assumptions about interfaces, variables and types. A tool that used annotations is described in "Static Detection of Dynamic Memory Errors", David Evans, ACM SIGPLAN Notices, 31(5) in Programming Language Design and Implementation, pp. 44–53 (May 1996). According to the Evans article, the tool calculates the constraints to satisfy these assumptions at compile-time and flags the corresponding places as possible bugs.

An Escape Analysis, to determine if the lifetime of data exceeds its static scope, is described in "Escape Analysis: Correctness, Proof, Implementation and Experimental Results", Bruno Blanchet, ACM SIGPLAN-SIGACT, in Proceedings of the 25th Annual Symposium on Principles of Programming Languages, pp. 25–37, San Diego, Calif. (January 1998). This technique can be used for stack allocation. This work takes into account polymorphism. Static analysis tries to cover all possible executions of a program. In order to achieve this, however, it must be very conservative. Therefore it may be very difficult in practice to predict the actual behavior of a program. Dynamic analysis examines exactly this behavior. Although dynamic analysis depends on a test set, and it will not catch all possible problems, it is very often a more efficient aid in solving memory problems.

The Heap Analysis Tool from Sun, as described by Bill Foote at http://developer.JAVA.sun.com/developer/early/Access/hat, is an example of a dynamic analysis tool. It allows the programmer to create snapshots of the object population and references, and to browse through the results. However, the amount of information can still be overwhelming for anything other than a simple case, since the browsing interface is very limited. The inability to see the high-level structure of objects and references, and to explore the result set interactively is a hindrance in practice when working with memory problems. The JPROBE and OPTIMIZEIT, manufactured by KL Group and Intuitive Systems, respectively, also provide heap browsers as part of their performance analysis tools. Although these tools have interactive browsing interfaces, neither provides a way to see overall patterns when there is a large number of objects. Thus, finding the cause of a memory leak can still be a slow process.

An overview of the present invention and its advantages will now be given. Most significantly, the present invention provides a new methodology for exploring data structures. The methodology may also be used to solve memory leak problems in JAVA. Memory problems in very complex application are tackled using a combination of the following three features. First, the user is allowed to identify a temporary operation in which temporary objects are expected to be created and released. Second, we exploit the fact that there is usually much repetition in the object structures of a complex system, and we extract patterns from the object reference space. Instead of individual objects, the user can now work with groups of objects with similar reference patterns. Third, in order to present the results from this synthesized, more abstract space of reference patterns, a new visual syntax is provided. This visualization points the user immediately to the causes of a memory leak. In addition, it allows the user to navigate and explore the results, in order to understand the dynamic context in which the leak occurred.

The present invention may be applied to explore data structures, as well as to solve memory problems ranging from simple to very complex. Moreover, with respect to the visualization of reference patterns, the present invention may be used in conjunction with complex query criteria specified by the user. One application of this will be to help the user distinguish temporary from permanent objects in much more complex memory leak scenarios. Another use will be to allow the user much greater flexibility in the exploration of complex data structures in general.

Further, the present invention may be used to perform what-if studies on large data structures. For example, by simulating the JAVA garbage collection algorithm within our visualization system, we will enable the user to experiment by observing the effect that severing a reference would have on the reclamation of objects.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

APPENDIX

Algorithm for the extraction of reference patterns from an object space.

We build a forest of trees with nodes representing object sets, using the following algorithm:
1. The user first indicates a starting set of objects. The choice of this starting set will be motivated by the specific problem at hand. For example, the user might ask to start the exploration of the object reference space from the "new" objects.
2. Partition the starting set A into subsets, A1, A2, . . . , An, of objects grouped by class. Each of these subsets will become the root of a reference pattern tree.
3. To each of these starting subsets A1, A2, . . . , An, apply the recursive operation (step 4):
4. For a subset of objects, Si (containing objects of the same class), which is a node in a tree:
    4a. Create a new set, Ri, of all the objects referring to any object in Si.
    4b. Partition this set Ri into subsets of objects, grouped by class: Ri1, Ri2, . . . , Rim.
5. These subsets Ri1, Ri2, . . . , Rim. will become the child nodes of the node representing Si.
6. Apply the recursive operation (step 4) to every child node in the tree, until reaching a user defined tree depth, set by the user, or as needed when a user interactively expands a node of the tree in the visualization.

To reverse the direction of references in this algorithm, replace "referring to" in step 4a by "referred to by".

What is claimed is:

1. A method for representing relationships among objects corresponding to a running program, the method comprising the steps of:
    representing a reference between a first set of objects grouped by user-defined criteria and a second set of objects grouped by the user-defined criteria using a first visual syntax, when each of the objects in the second set refer to at least one object in the first set;
    representing a direction of the reference between the first and second sets using a second visual syntax; and
    representing whether there are any objects in the first and second sets created one of precedent and during a temporary operation using a fourth visual syntax.

2. The method of claim 1, further comprising the step of representing a number of objects in the first and second sets using a third visual syntax.

3. The method of claim 1, further comprising the step of representing a starting set of objects grouped by the user-defined criteria using a fifth visual syntax.

4. The method of claim 1, wherein the user-defined criteria is package.

5. The method of claim 1, further comprising the steps of:
    representing a class object comprising static members of the class using a sixth visual syntax; and
    representing a set of objects that include the class object using a seventh visual syntax.

6. A method for representing relationships among objects corresponding to a running program, the method comprising the steps of:
    representing a reference between a first set of objects grouped by user-defined criteria and a second set of objects grouped by the user-defined criteria using a first visual syntax, when each of the objects in the second set refer to at least one object in the first set;
    representing a direction of the reference between the first and second sets using a second visual syntax;
    representing a class object comprising static members of the class using a sixth visual syntax; and
    representing a set of objects that include the class object using a seventh visual syntax.

7. The method of claim 6, further comprising the step of representing a number of objects in the first and second sets using a third visual syntax.

8. The method of claim 6, further comprising the step of representing whether there are any objects in the first and second sets created one of precedent and during a temporary operation using a fourth visual syntax.

9. The method of claim 6, further comprising the step of representing a starting set of objects grouped by the user-defined criteria using a fifth visual syntax.

10. The method of claim 6, wherein the user-defined criteria is package.

11. A method for displaying references to leaking objects corresponding to a temporary operation in a running program, comprising the steps of:
    inventorying a first set of objects corresponding to objects in an object heap at a point in time preceding the performance of the temporary operation, a second set of objects corresponding to objects in the object heap at a point in time during the performance of the temporary operation, references between the objects of the second set, and references starting from non-JAVA sources to the objects of the second set;
    comparing identifiers associated with the objects in the first set of objects to identifiers associated with the objects in the second set of objects to identify a third set of objects corresponding to the objects in the second set of objects that are not in the first set of objects;
    displaying the references to the objects in the third set of objects.

12. The method according to claim 11, wherein said inventorying step comprises the step of excluding objects that are garbage collectable.

13. A program storage device readable by machine, tangibly embodying a program of instructions executable by the machine to perform method steps for extracting patterns of reference relationships among objects corresponding to a running program, said method steps comprising:
    (a) designating a starting set of objects; and
    (b) partitioning the starting set of objects into subsets of objects grouped by class;
    (c) applying a recursive operation to each of the starting subsets, wherein the recursive operation comprises the steps of:
        (c1) given a subset of objects, identifying a second set of objects, wherein the second set includes all objects that refer to at least one object in the subset when a direction of reference terminates at the starting set, and the second set includes all objects that are referred to by at least one object in the subset when the direction of reference originates from the starting set;
        (c2) partitioning the second set into new subsets of objects grouped by class; and
    (d) applying the recursive operation to each of the new subsets until a predefined depth is reached.

14. The program storage device of claim 13, wherein said designating step further comprises the steps of:
  identifying objects that cannot be reclaimed in a garbage collection procedure.

15. The program storage device of claim 13, wherein the starting set of objects comprises at least one of JAVA local variables and JAVA native interface roots.

16. The program storage device of claim 13, further comprising the step of depicting the patterns of reference visually as a forest of trees, wherein the roots of each tree emanate from the starting set of objects.

17. A program storage device readable by machine, tangibly embodying a program of instructions executable by the machine to perform method steps for representing relationships among objects corresponding to a running program, said method steps comprising:
  representing a reference between a first set of objects grouped by user-defined criteria and a second set of objects grouped by the user-defined criteria using a first visual syntax, when each of the objects in the second set refer to at least one object in the first set;
  representing a direction of the reference between the first and second sets using a second visual syntax; and
  representing whether there are any objects in the first and second sets created one of precedent and during a temporary operation using a fourth visual syntax.

18. The program storage device of claim 17, further comprising the step of representing a number of objects in the first and second sets using a third visual syntax.

19. The program storage device of claim 17, further comprising the step of representing a starting set of objects grouped by the user-defined criteria using a fifth visual syntax.

20. The program storage device of claim 17, wherein the user-defined criteria is package.

21. The program storage device of claim 17, further comprising the steps of:
  representing a class object comprising static members of the class using a sixth visual syntax; and
  representing a set of objects that include the class object using a seventh visual syntax.

22. A program storage device readable by machine, tangibly embodying a program of instructions executable by the machine to perform method steps for representing relationships among objects corresponding to a running program, said method steps comprising:
  representing a reference between a first set of objects grouped by user-defined criteria and a second set of objects grouped by the user-defined criteria using a first visual syntax, when each of the objects in the second set refer to at least one object in the first set;
  representing a direction of the reference between the first and second sets using a second visual syntax;
  representing a class object comprising static members of the class using a sixth visual syntax; and
  representing a set of objects that include the class object using a seventh visual syntax.

23. The program storage device of claim 22, further comprising the step of representing a number of objects in the first and second sets using a third visual syntax.

24. The program storage device of claim 22, further comprising the step of representing whether there are any objects in the first and second sets created one of precedent and during a temporary operation using a fourth visual syntax.

25. The program storage device of claim 22, further comprising the step of representing a starting set of objects grouped by the user-defined criteria using a fifth visual syntax.

26. The program storage device of claim 22, wherein the user-defined criteria is package.

* * * * *